United States Patent

[11] 3,623,070

[72] Inventors Ronald W. Johnson
Cherry Hill, N.J.;
Harry F. Geib, Trevose, Pa.

[21] Appl. No. 31,714
[22] Filed Apr. 24, 1970
[45] Patented Nov. 23, 1971
[73] Assignee Ultronic Systems

[54] TRAVELING-MESSAGE DISPLAY SYSTEM
8 Claims, 1 Drawing Fig.

[52] U.S. Cl. .......... 340/339, 235/92 SH, 340/154, 340/324 R, 340/334
[51] Int. Cl. .......... G08b 5/36
[50] Field of Search .......... 340/154, 324 R, 339, 334

[56] References Cited

UNITED STATES PATENTS

| | | | |
|---|---|---|---|
| 3,416,133 | 12/1968 | Hunkins et al. | 340/154 |
| 3,462,739 | 8/1969 | Scantlin | 340/154 |
| 3,493,956 | 2/1970 | Andrews et al. | 340/334 |
| 3,566,090 | 2/1971 | Johnson | 340/154 X |
| 3,566,388 | 2/1971 | Andrews et al. | 340/334 |

Primary Examiner—John W. Caldwell
Assistant Examiner—David L. Trafton
Attorneys—Norman J. O'Malley and Theodore C. Jay, Jr.

ABSTRACT: Moving ticker display apparatus for displaying stock exchange transaction information employs an array of neon lamps arranged in rows and columns. Characters are formed on the extreme right-hand column of the array, one vertical line at a time, and move from right to left at a variable rate. The rate at which characters are displayed and the rate at which information is received normally differs. A recirculating buffer receives incoming information and makes same available for further processing prior to visual presentation by the matrix. At least one stage of the buffer is always empty. A plurality of discretely different speeds are available for advancing the display across the array. The particular speed utilized at any time depends upon the number of stages in the buffer which are filled at the time. Digital speed selector means, responsive to this number, selects the appropriate one of these speeds for use.

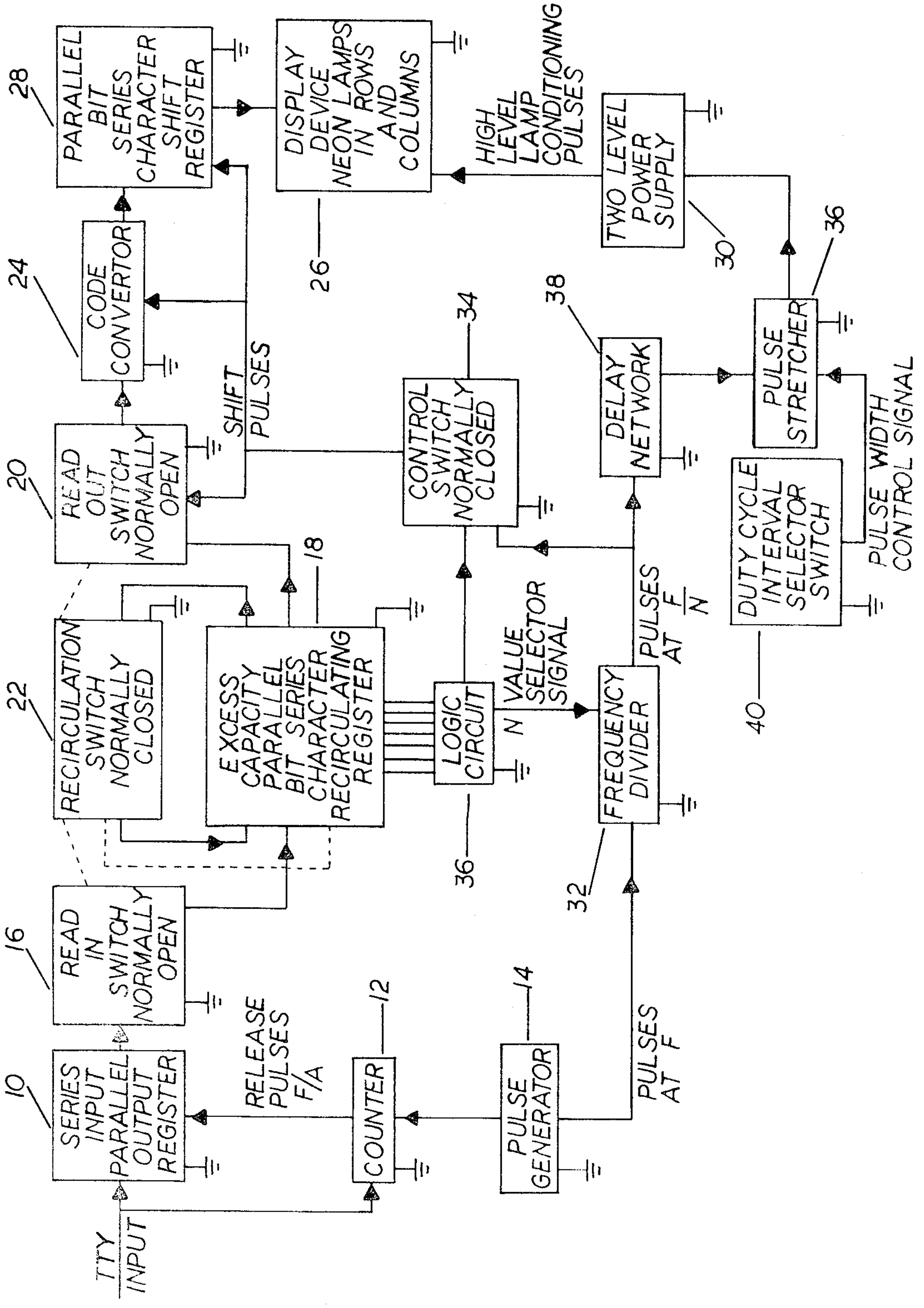
INVENTOR.
HARRY F. GEIB
RONALD W. JOHNSON
By [signature]
ATTORNEY

TRAVELING-MESSAGE DISPLAY SYSTEM

BACKGROUND OF THE INVENTION

U.S. Pat. No. 3,493,956 discloses a moving ticker display of stock exchange information which employs a matrix of neon lamps arranged in rows and columns. Characters are formed at the extreme right-hand column of the matrix one vertical line at a time, and move from right to left at variable speed. Characteristically, the rate at which information is received exhibits sudden starts and stops. Since viewers of the moving display would find such starts and stops to be uncomfortable to the eye, means including a storage buffer and a timing control are provided to smooth out the transitions. The buffer receives the input data at the rate of data input to the display. This data passes successively through each stage in the buffer under the control of shift pulses generated by the timing circuit at a rate governed by, but not synchronous with, the rate of data input. The timing control also supplies these shift pulses to the matrix to control the rate of advance of the display. This control includes a variable-frequency oscillator for generating the shift pulses at the desired frequencies, as well as means for sampling the contents of the buffer, and a slow time constant analog circuit responsive to the sampling means to vary the frequency of the oscillator accordingly.

Such analog control techniques are inherently susceptible to spurious frequency changes which produce visual distortions and other undesirable phenomena and which arise because of unavoidable transients, powder level changes and other adverse electrical conditions on the main supply line.

We have succeeded in overcoming these problems by developing equipment which utilizes digital rather than analog control techniques and which, as a consequence, is much less susceptible to adverse electric conditions on the main line.

SUMMARY OF THE INVENTION

In accordance with our invention, we employ a traveling message display system for stock exchange transactions or the like wherein information is supplied thereto at a first variable rate subject to sudden stops and starts. The information is to be displayed as characters on an array of neon lamps or the like arranged in rows and columns. The characters are formed, one column at a time, on the extreme right-hand column of the array and are moved thereacross from right to left at a second variable rate. To eliminate the undesired visual effects of sudden starts and stops of the display, the second rate is to change in such manner that sudden stops and starts are eliminated. This is accomplished by varying the second rate in such manner that the displayed information appears to accelerate or decelerate linearly as the supplied information starts and stops. The first and second rates can differ from each other over short time intervals for this purpose, providing that the averages of these two rates are the same. If the average rates differ, the acceleration and deceleration will occur improperly in a nonlinear manner.

In our system, the incident information is supplied via suitable means to a buffer. The buffer has a first state at which information is recirculated therethrough at a selected fixed speed and has a second state at which information is statically stored therein without recirculation. The buffer has a storage capacity in excess of that required by the array whereby at least one storage stage is always empty. The buffer is normally in the first state and is placed in the second state only in the presence of shift pulses.

A shift register is provided with a like array of storage elements arranged in like rows and columns, each element being coupled at its output to a corresponding lamp. Information is supplied to the extreme right-hand column of elements and is shifted column by column therethrough under the control of the shift pulses. The information in the register is displayed on the array.

First means coupled between the buffer and the register supply information, when the buffer is in the second state, from the buffer output to the extreme right column of elements in the register.

A generator produces pulses at a fixed recurrence frequency F. A divide-by-*n* counter, where N is a variable integer, is coupled to the generator and derives from the pulses of fixed frequency a pulse train at a variable frequency F/N. Second means coupled between counter, buffer and register supply these variable frequency pulses as shift pulses to the buffer and register. The shift pulses thus determine the second variable rate employed in the system.

Third means coupled between the buffer and the counter and enabled when the buffer is in the second state produces a digital signal varying with the amount of information stored in the buffer, for example varying with the number of filled stages therein. This digital signal is supplied to the counter to select the value of N.

Thus, our system has available for use a plurality of discretely different speeds for controlling the visual display, the particular speed to be selected for use being determined by the quantity of information in the buffer. The signal used in selecting the speed is itself digital in nature. The digital technique so employed overcomes the problem of spurious frequency generation and at the same time provides the desired smoothing action to eliminate sudden stops and starts in the display.

BRIEF DESCRIPTION OF THE DRAWINGS

The accompanying FIGURE is a block diagram of our invention.

DETAILED DESCRIPTION OF PREFERRED EMBODIMENTS

Referring now to the FIGURE, incoming stock exchange transaction data arrives in series bit series character format to the input of a series bit input parallel bit output register 10. The data is in binary form using the conventional mark space code used by the New York Stock Exchange code. Each bit is clocked into the register by a separate clock pulse supplied by counter 12. Counter 12 receives clock pulses at a fixed recurrence frequency F from pulse generator 14. The counter has a selected count of constant A whereby the recurrence frequency of the clock pulses is F/A. The value of A is selected in accordance with the minimum speed of transmission of the particular exchange. The incoming data is also supplied to counter A to reset same for each incoming character to maintain proper synchronism.

This action forms a complete character in parallel bit form at the output of register 10. Read-in switch or gate 16, normally open, is interposed between register 10 and an input of an excess capacity, parallel bit, series character recirculating register 18. The output of the buffer appears at normally open readout switch or gate 20 and is also coupled to a second buffer input via a normally closed recirculation switch or gate 22. Switches 16, 20, and 22 are so interconnected that closure of switch 22 opens switches 16 and 20, closure of switch 20 closes switch 16 and opens switch 22, and the opening of switch 20 opens switch 16 and closes switch 22. Switch 20 is closed only in the presence of shift pulses supplied thereto.

Recirculation register 18 is a buffer having a first state at which information supplied thereto is recirculated therethrough at a selected fixed speed which is much faster than the fastest rate at which information is supplied from register 10. This first state, which is the normal state, exists when switch 22 is closed and switches 18 and 20 are open. The buffer has a second rate at which information is stored therein statically without recirculation. This second state exists only when switch 22 is open and switches 18 and 20 are open, i.e., when shift pulses are present. Information can only be read into the buffer and/or read out of the buffer when the buffer is in the second state.

Information is fed out of the buffer through switch 20 to a code converter 24 or translator which converts the stock exchange code into another code suitable for display such as a five by seven or five by 10 dot matrix whereby characters for display are developed in matrix form.

An array 26 of neon lamps are arranged in rows and columns. A shift register 28 contains a like array of storage elements arranged into like rows and columns, the output of each element being connected to one electrode of a corresponding lamp. The other electrodes of each of the lamps are all connected in parallel to the output of two-level power supply 30.

The lamp array is adapted to display characters in such manner that they appear one vertical line at at time at the extreme right-hand column and travel from right to left at a variable rate. This rate is determined by the like rate at which information in dot matrix form is transferred, one vertical line at a time, from the converter 24 to the extreme right-hand column of the register and thereafter from right to left therein, column by column under the control of the shift pulses.

The shift pulses have a recurrence frequency of F/N where F is the recurrence frequency of generator 14 and N is a variable integer. In order to produce same, the pulses produced by generator pass through a divide-by-*n* counter 32, where N is this variable integer whereby pulses at frequency F/N are produced. These pulses, after passing through normally closed control switch or gate 34, are supplied as the desired shift pulses.

The value of N is determined as follows. A logic circuit 36 is connected at its input to each stage in buffer 18 by a set of transfer gates or other means which are enabled only when switch 22 is open. Stated differently, logic circuit 36 is connected at its input to each stage in buffer 18 at instants when information is stored therein statically. The purpose of this input connection is to determine the number of buffer stages which contain information at such instants. The buffer is so designed as to always have excess capacity when the system is operative whereby at least one stage in the buffer is always empty. Each stage in the buffer can have a separate flip-flop associated therewith which is in one state when the stage is empty and is in a second state when at least one bit is stored therein. The logic circuit, when enabled, yields a digital signal at its output which attains a different discrete value for each different number of full stages in buffer 18. This digital signal is supplied to counter 32 to determine the value N accordingly. If the number of full stages in the buffer can vary from zero to a maximum of B stages where B is an integer, the digital signal can attain any one of (B+1) different values. Similarly, N can attain any one of (B+1) different values. This frequency thus is varied in discrete steps as the number of filled stages of information in the buffer varies, being a maximum when this number reaches a maximum and decreasing as this number decreases. When the buffer is empty, the movement of characters on the display must stop. To accomplish this, the logic circuit yields an additional signal when the buffer is empty, this additional signal being supplied to normally closed gate 34 to open same and thus prevent shift pulses from being supplied to the system.

The net result is that as the information fed to our system over ticker input lines or the like exhibits sudden starts and stops, the displayed information appears to accelerate or decelerate linearly, and eye discomfort is avoided. Moreover, the average rate at which this information arrives is always equal to the average rate at which the characters move across the display.

The neon lamps in array must all be dark during shifting. Depending upon the requirements of the character display matrix, certain lamps will be lit and certain lamps will be dark for display requirements. To this end, any storage element in register 28 maintains an electrode of the corresponding neon lamp at a low potential of one polarity when the lamp is to be dark and at a high potential of like polarity when the lamp is to be lit. At the same time, a potential of opposite polarity is applied to the opposite electrodes of all lamps from power supply 30. When the voltage from supply 30 is low, the voltage drop across each lamp is insufficient to produce light, regardless of the condition of the storage elements in register 28. When the potential from the supply is of the same polarity but substantially increased in magnitude those lamps having opposite electrodes maintained at high potential of opposite polarity will light while the other lamps remain dark.

The potential from the supply is normally low but is raised to a high value in the presence of pulses supplied to the input of the supply via pulse stretcher 36. The pulses at frequency F/N yielded by counter 32 are supplied through delay network or line 38 to the stretcher 36 wherein the pulses are widened under the control of a manually operated duty cycle switch 40.

The duty cycle is defined as the ratio of the period between adjacent shift pulses in which a lamp is lit to the total period between such pulses. We employ a cycle ranging between 12.5 to 25 percent. Thus, each pulse is stretched to have this duration. During the interval in which each such pulse is supplied to the input of the power supply, the output of the supply is sharply increased as a high-potential pulse. The delay 40 is used to prevent any lamp from being accidentally lit during shifting.

Additional information on the divide-by-*n* counter, logic circuit and buffer stage flip-flops can be found in the copending application of Ronald W. Johnson entitled "Apparatus for Controlling the Rate of Transfer of Information" filed Nov. 25, 1968, Ser. No. 778,605. Additional information on the two-level power supply and operation of the lamps can be found in another copending application of the same inventor entitled "Visual Indicator Supply Apparatus and System," filed Nov. 8, 1968, Ser. No. 774,360. Both of these applications and the present application have been assigned to the same assignee.

What is claimed is:

1. In a traveling-message display system wherein information for display is supplied thereto at a first variable rate subject to sudden starts and stops and wherein this information is displayed as characters on an array of neon lamps arranged in rows and columns, said characters being formed, one column at a time, on the extreme right-hand column of the array and being moved at a second variable rate from right to left thereacrss, the second rate not being subject to sudden starts and stops, the averages of said two rates being equal, in combination:

a buffer having a first state at which information supplied thereto is recirculated therethrough at a selected fixed speed and having a second state at which information is stored statically therein, said buffer being normally in the first state and being placed in the second state only in the presence of shift pulses, said buffer having a storage capacity in excess of that required by the array;

a shift register having a like array of storage elements arranged into like rows and columns, each element being coupled to a corresponding lamp, information being supplied to the extreme right-hand column of elements in the register and being shifted column by column therethrough under the control of said shift pulses, the information in the register being displayed by the array;

first means coupled between said buffer and said register to supply information when the buffer is in the second state from the output of the buffer to the register for display by the array;

a generator for producing pulses at a fixed recurrence frequency F;

a divide-by-N counter, where N is a variable integer, coupled at its input to the generator, said counter yielding at its output a pulse train at a variable recurrence frequency F/N;

second means coupled between the counter, buffer and register to supply said variable frequency pulse train as shift pulses at said variable frequency to the buffer and register, thereby determining said second rate; and third means coupled between the buffer and the counter and enabled when the buffer is in the second state to produce a digital signal which varies with the amount of information stored in the buffer said signal being supplied to said counter to determine the value of N.

2. The combination as set forth in claim 1 wherein the amount of information in the buffer is directly proportional to the number of filled stages.

3. The combination as set forth in claim 2 wherein the information supplied to the system is in a first code and is to be displayed in a second code, said first means including a translator for transforming the first code to the second code.

4. The combination as set forth in claim 3 wherein said third means produces an additional signal when the buffer is empty, said second means being responsive to the additional signal to cut off the supply of shift pulses to said buffer and register.

5. The combination as set forth in claim 4 further including fourth means responsive to said variable frequency pulse train to supply a second train of like frequency and fixed delay less than the period between adjacent pulses at the highest frequency F/N to all lamps in the array.

6. The combination as set forth in claim 6 wherein said delay is less than 75 percent of said period.

7. The combination as set forth in claim 6 wherein said fourth means includes fifth means manually operable to select an increased width for each delayed pulse and sixth means to widen each delayed pulse accordingly.

8. The combination as set forth in claim 7 wherein said fourth means includes a power supply normally yielding a low-level signal, said supply yielding a high-level signal in the presence of each delayed pulse of increased width.

* * * * *